United States Patent

Pötz et al.

[11] Patent Number: 5,483,560
[45] Date of Patent: Jan. 9, 1996

[54] METHOD AND APPARATUS FOR TESTING, REPAIRING OR EXCHANGING THE NOZZLES PASSING THROUGH THE BOTTOM OF A REACTOR PRESSURE VESSEL

[75] Inventors: Franz Pötz, Heppenheim; Jakob Russ, Römerberg, both of Germany

[73] Assignee: ABB Reaktor GmbH, Mannheim, Germany

[21] Appl. No.: 183,520

[22] Filed: Jan. 19, 1994

[30] Foreign Application Priority Data

Jan. 28, 1993 [DE] Germany .......................... 43 02 330.4

[51] Int. Cl.$^6$ .................................................. G21C 17/00
[52] U.S. Cl. .................... 376/250; 376/254; 376/247; 376/271; 376/287
[58] Field of Search .................................. 376/250, 254, 376/247, 271, 287

[56] References Cited

U.S. PATENT DOCUMENTS

| | | | |
|---|---|---|---|
| 4,313,793 | 2/1982 | Klumb et al. | 376/260 |
| 4,664,872 | 3/1987 | Kiewitz et al. | 376/260 |
| 4,865,801 | 9/1989 | Brahm et al. | 376/260 |
| 4,966,747 | 10/1990 | Tower et al. | 376/254 |
| 4,983,351 | 1/1991 | Tower et al. | 376/254 |
| 4,986,954 | 1/1991 | Feurgard | 376/254 |
| 5,263,060 | 11/1993 | Obermeyer | 376/254 |
| 5,305,357 | 4/1994 | Ekeroth | 376/254 |

FOREIGN PATENT DOCUMENTS 3338520 5/1985 Germany .

OTHER PUBLICATIONS

Japanese Patent Abstract No. 2-105097 (Kurosawa), dated Apr. 17, 1990 (Abstract Translated).

Primary Examiner—Donald P. Walsh
Assistant Examiner—Meena Chelliah

[57] ABSTRACT

A method and an apparatus for testing, repairing or exchanging nozzles of the bottom of a reactor pressure vessel include inserting individual shielding containers into the reactor pressure vessel. Shafts pass through a shielding container and water-filled cartridges can be inserted into the shafts. Tubes for receiving probes of an in-core instrumentation are embedded into bottom plates of the remaining shielding containers and into bottoms of the cartridges. After removing a cartridge, a carrier for working tools can be introduced into the shaft. In this way the radioactive loading is considerably reduced by the probes inside or outside the reactor pressure vessel.

7 Claims, 3 Drawing Sheets

METHOD AND APPARATUS FOR TESTING, REPAIRING OR EXCHANGING THE NOZZLES PASSING THROUGH THE BOTTOM OF A REACTOR PRESSURE VESSEL

BACKGROUND OF THE INVENTION

FIELD OF THE INVENTION

The invention relates to a process for testing, repairing or exchanging nozzles penetrating the bottom of a reactor pressure vessel, wherein each nozzle serves for the introduction of a respective probe of an in-core instrumentation of a water-cooled nuclear reactor.

Depending on the power and type of the nuclear reactor, a greater or lesser number (about 50) of nozzles pass through the bottom of the reactor pressure vessel. The probes, which are fitted with detectors on their free end regions, are made to enter the fuel assemblies during reactor operation. They are therefore exposed to a high level of radioactive radiation. If testing, repairing or exchanging of nozzles is necessary, the fuel assemblies of the reactor core and all of the core internals are removed from the reactor pressure vessel. Before taking out the fuel assemblies, the probes of the in-core instrumentation, which can travel in channels of the fuel assemblies, must be parked outside in guide tubes leading away from the nozzles. Since the detectors are highly contaminated, due to their insertion in the reactor core, an undesired radioactive loading is the consequence.

SUMMARY OF THE INVENTION

It is accordingly an object of the invention to provide a method and an apparatus for testing, repairing or exchanging nozzles passing through the bottom of a reactor pressure vessel, which overcome the hereinafore-mentioned disadvantages of the heretofore-known methods and devices of this general type and in which radioactive loading by detectors of in-core instrumentation is considerably reduced.

With the foregoing and other objects in view there is provided, in accordance with the invention, in a method for testing, repairing or exchanging nozzles penetrating a bottom of a reactor pressure vessel, wherein each nozzle serves for the introduction of a respective probe of an in-core instrumentation of a water-cooled nuclear reactor, the improvement which comprises:

a. inserting at least one shielding container into the reactor pressure vessel;
b. introducing all of the probes of the in-core instrumentation into a shielding region of the at least one shielding container;
c. withdrawing at least one of the probes assigned to one of the nozzles to be tested or worked on, from the reactor pressure vessel;
d. exposing a shaft extending through the shielding container and being assigned to at least one of the nozzles;
e. introducing testing devices or tools through the shaft;
f. carrying out at least one of testing and working operations;
g. withdrawing the testing devices or tools from the shaft;
h. shielding the shaft;
i. introducing the probe into the shielding region of the shielding container; and
j. repeating steps c to j for further nozzles.

During work being performed on a nozzle assigned to one shaft, the remaining probes are located in the shielding region of the shielding container, so that the radioactive loading inside and outside the pressure vessel is reduced considerably. The method successfully accomplishes an integration of the shielding and working operations.

In accordance with another mode of the invention, there is provided a method which comprises cutting off a nozzle to be repaired, just above an inner surface of the bottom; drilling open a nozzle part remaining in the bottom to form a staged nozzle bore; inserting a new staged nozzle part into the nozzle bore; establishing a supporting connection by means of a weld seam; and applying a sealing weld seam at a lower end of the staged bore.

With the objects of the invention in view, there is also provided, in a water-cooled nuclear reactor having a reactor pressure vessel with a bottom, a flange and a cross section, and nozzles each penetrating the bottom for the introduction of a respective probe of an in-core instrumentation of the nuclear reactor, an apparatus for testing, repairing or exchanging the nozzles, comprising a plurality of shielding containers together filling the cross section of the reactor pressure vessel, the shielding containers having a supporting flange supported on the reactor pressure vessel flange, and the shielding containers having bottom plates ending above the nozzles; a plurality of shafts passing through the bottom plate of at least one of the shielding container and engaging over the nozzles located in a corresponding partial cross section of the reactor pressure vessel; a water-filled cartridge to be inserted into each of the shafts, the cartridges having bottoms each ending above a respective one of the nozzles; tubes for receiving the probes; at least one of the tubes being embedded in at least one of the bottoms and having a closed end protruding by a predetermined amount into the cartridge and an open end being adjacent one of the nozzles; the bottom plate of the others or the remainder of the shielding containers through which the shafts do not pass, having others of the tubes embedded therein with closed ends protruding by a predetermined amount into the shielding containers and open ends adjacent the nozzles covered by or facing away from the shielding container; carriers for traveling in the shaft and receiving at least one of testing devices and tools; and each of the shafts having means for guiding one of the carriers.

The inside diameters of the tubes correspond approximately to that of the nozzles, so that they serve as guide tubes for the probes and so that their free ends, which are fitted with the detectors, pass without any problem into the shielding region of the shielding container. As a rule, the cross section of the reactor pressure vessel is covered by four shielding containers, each including approximately a quadrant sector. If only one quadrant sector is provided with shafts, after the completion of work in one reactor pressure vessel sector, the shielding container can be turned through 90° in order to work on the nozzles of the next reactor pressure vessel sector. In the shafts which are not accessible at that time to the carrier for receiving testing devices or tools, a water-filled cartridge performs the shielding task. Consequently, an apparatus has been created in which the working and shielding are combined in a compact structure.

In accordance with another feature of the invention, the means for guiding the carrier are preferably assigned to the region of the shaft beginning underneath the respective cartridge.

Consequently, the guiding means do not result in any cross-sectional reduction of the cartridges and consequently do not result in any reduction in the shielding effect.

In accordance with a further feature of the invention, the guiding means are rails on which the carrier can be securely clamped.

In accordance with a concomitant feature of the invention, there is provided a sealing element disposed between the bottom of the reactor pressure vessel and the lower edge of the shaft, for localizing the swarf or chips generated inside a shaft.

Other features which are considered as characteristic for the invention are set forth in the appended claims.

Although the invention is illustrated and described herein as embodied in a method and an apparatus for testing, repairing or exchanging nozzles passing through the bottom of a reactor pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
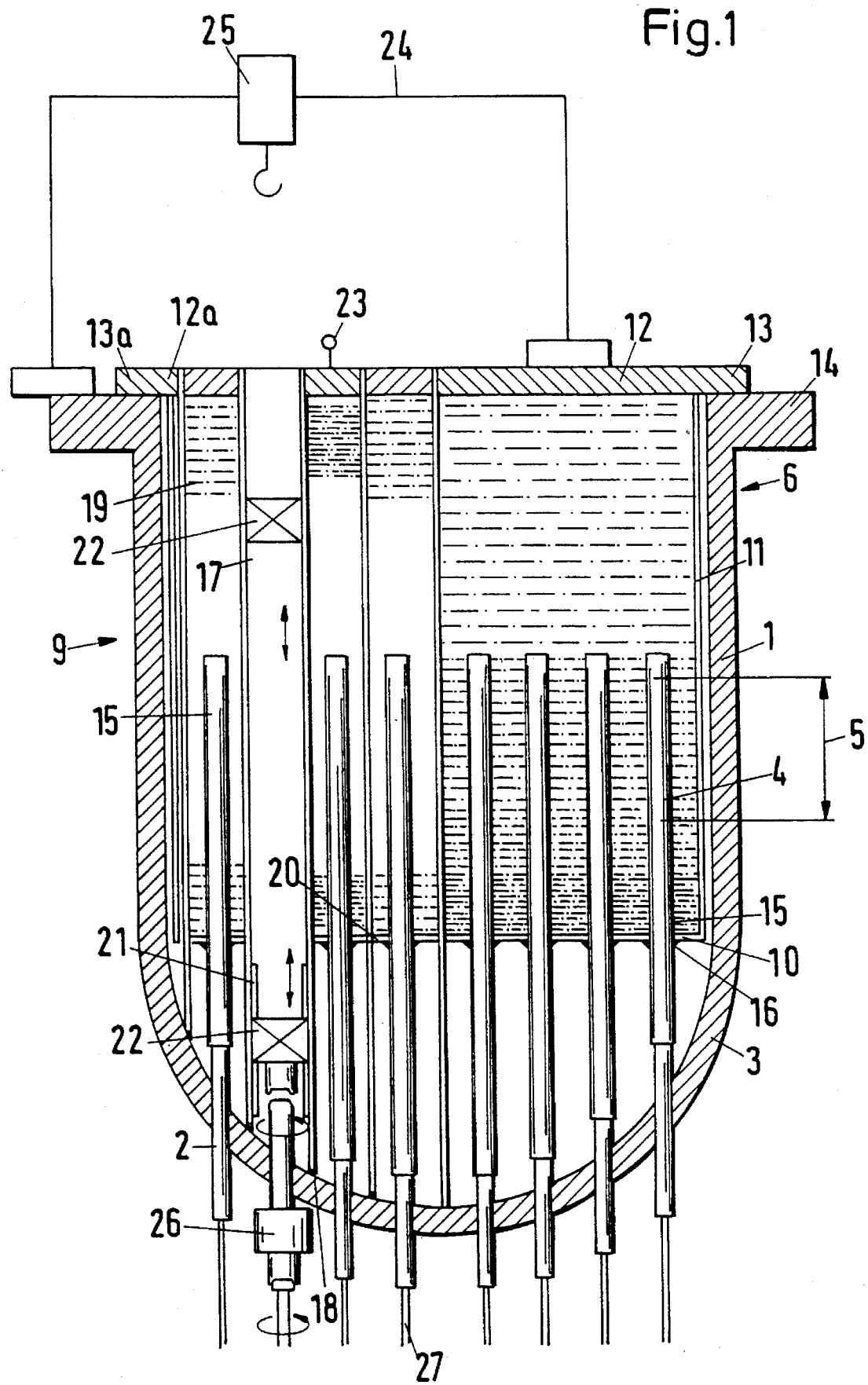
FIG. 1 is a diagrammatic, longitudinal-sectional view of a reactor pressure vessel with a testing, repair or removal apparatus.

Referring now to the figures of the drawing in detail and first, particularly, to FIG. 1 thereof, there is seen a diagrammatic representation of a cross section through a reactor pressure vessel 1, from which a reactor core and all other core internals have been removed. A multiplicity of nozzles 2 pass through a hemispherical bottom 3 of the reactor pressure vessel. For reasons of clearer representation, only a few nozzles 2 are illustrated, although there are actually about 50 nozzles. During operation of the reactor plant the nozzles serve for the introduction of probes 4 of a so-called in-core instrumentation into the non-illustrated reactor core. The probes have free end regions 5 which are fitted with non-illustrated detectors for determining core data.

Figure 2:
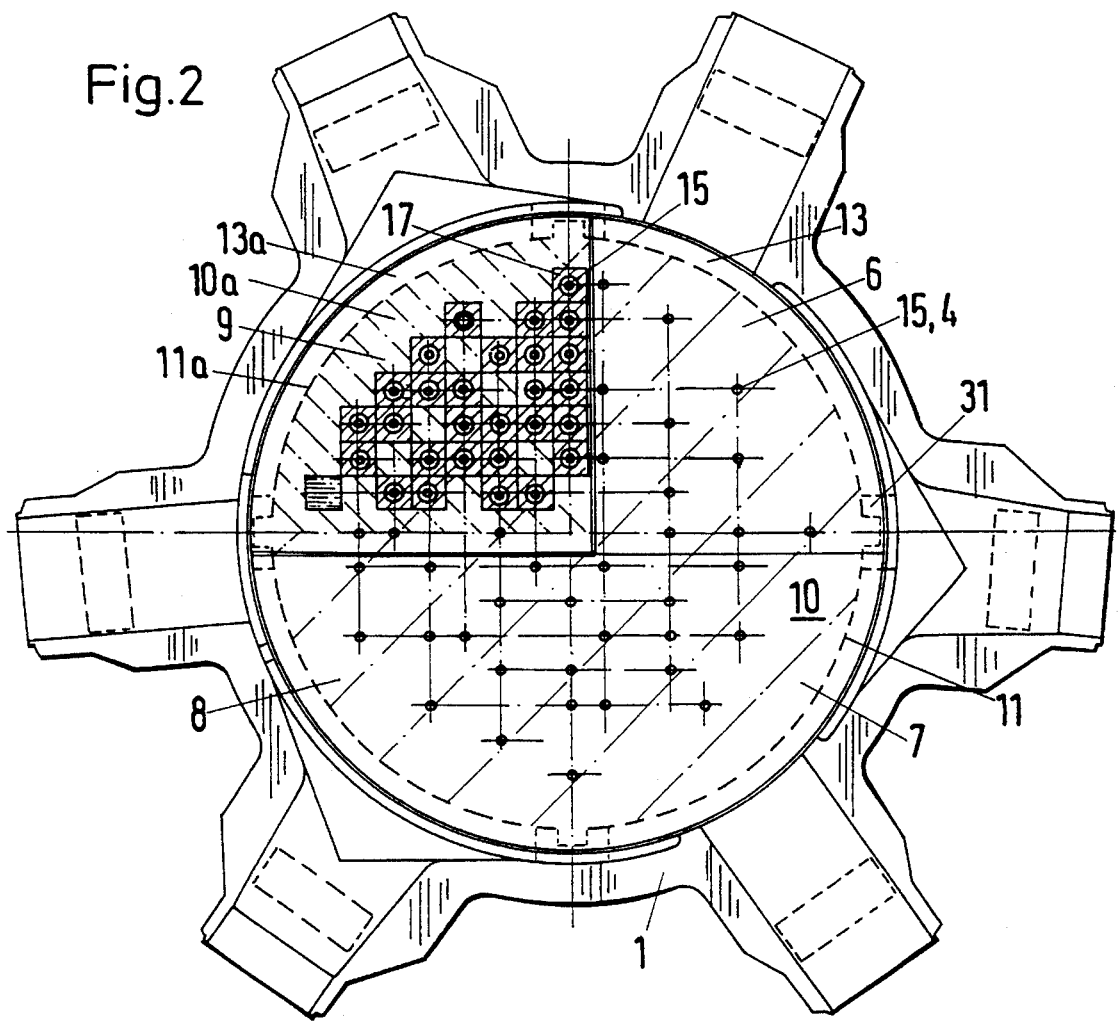
FIG. 2 is a top-plan view of FIG. 1 on a different scale.

If it is found that a repair or an exchange of nozzles is necessary during the inspection of the nozzles, which takes place at certain time intervals, four shielding containers 6, 7, 8, 9 are inserted into the reactor pressure vessel 1, as is also seen in FIG. 2. The shielding containers generally contain water as the shielding medium and correspond in their cross section approximately to a quadrant sector, so that together they cover the interior cross section of the reactor pressure vessel. Three shielding containers 6, 7, 8 include a quadrantal bottom plate 10. Perpendicularly upward extending side walls 11 lead away from the outline of the bottom plate 10. A termination of the shielding containers 6, 7, 8 is formed by a top plate 12. The top plate 12 has a side facing the periphery of the reactor pressure vessel which is constructed as a supporting flange 13. The supporting flange 13 supports the shielding containers 6, 7, 8 on a reactor pressure vessel flange 14, and in the inserted state the bottom plate 10 of the shielding containers 6, 7, 8 extend approximately as far as a transition of the cylindrical reactor pressure vessel wall with the hemispherical bottom 3. Tubes 15 are set or imbedded into the bottom plate 10 and in each case are fixed by a weld seam 16. The tubes 15 have open ends which extend to the nozzles 2 and each nozzle of a quadrant sector of the bottom 3 has a tube 15 concentrically engaged over it. A closed end of each tube 15 protrudes so far into the respective shielding container 6, 7, 8 that a probe 4 is disposed with its free end region 5 in the shielding region of the shielding container. The position adopted generally corresponds to the probe position during operation of the reactor plant.

As is evident from FIG. 2, which is represented on a different scale, shafts 17 pass through a bottom plate 10a of the shielding container 9. A shaft 17 is coaxially engaged over each nozzle 2 of the corresponding reactor pressure vessel quadrant cross section. A sealing element 18 seen in FIG. 1 is disposed between a lower edge of the shaft 17 and the hemispherical bottom 3, so that when working on the nozzle the swarf or chips remain in a controllable region and can easily be sucked away. Each shaft 17 has an upper end which is set or imbedded into a top plate 12a, although its opening cross section remains free. Side walls 11a seen in FIG. 2 extend between the bottom plate 10a and the top plate 12a, so that a closed shielding container 9 is produced which has an inner space that is filled by the shafts and the shielding medium, water, which fully or partially surrounds the shafts. If appropriate, part of a side wall 11a may be composed of the aligned shafts 17 themselves. Similarly to the top plate 12 of the shielding containers 6, 7, 8, the top plate 12a has a side facing the periphery of the reactor pressure vessel which is constructed as a supporting flange 13a for supporting the shielding container 9 on the reactor pressure vessel flange 14.

Inserted into each shaft 17 is a water-filled cartridge 19, that is closed on all sides, maintains a small lateral play with respect to the wall of the shaft, and is supported on an upper rim of the shaft. A bottom 20 of the cartridge 19 extends approximately down to the level of the bottom plate 10a. A tube 15 is set or imbedded into the cartridge bottom 20 in the same way as in the bottom plate 10 of the shielding containers 6, 7, 8. It similarly engages over a nozzle 2, so that the probe 4 can be disposed in the shielding region of the shielding container 9 in the same way.

Each shaft 17 has a rail 21 underneath the cartridge 19 for longitudinally guiding and, if appropriate, for arresting a carrier 22, which serves for receiving testing devices and/or working tools. If a particular nozzle is to be inspected, repaired or exchanged, the probe 4 assigned to the nozzle is moved outside the reactor pressure vessel and the cartridge 19 of the corresponding shaft is removed with the aid of a non-illustrated lifting tackle, acting upon means 23 for attaching the cartridge 19. With the aid of a supporting frame 24 and a cable winch 25 assigned to the same, the carrier 22 is introduced into the exposed shaft 17 and is fixed on the rails 21 in relation to the nozzle 2. While the testing and the working required for repair of the nozzle can be performed from inside the reactor pressure vessel, in order to exchange the nozzle a tool carrier 26 acting from outside the reactor pressure vessel is additionally required. The wall of the reactor pressure vessel 1 has projections 31 seen in FIG. 2, which are used as a centering aid for the shielding containers.

If an inspection of the nozzles 2 is due, all of the probes 4 are parked in guide tubes 27 being disposed outside the reactor pressure vessel and leading away from the nozzles. Once all of the components of the reactor core have been removed from the reactor pressure vessel, the shielding containers 6, 7, 8 and the shielding container 9 that is fitted with cartridges 19, are inserted into the reactor pressure vessel. All of the probes are then made to enter the tubes 15 of the shielding containers 6, 7, 8 and the cartridge 19 of the shielding container 9, so that the end regions 5 of the probes, bearing the detectors, are disposed in the shielding region of the shielding containers 6, 7, 8, 9. By withdrawing a probe 4 from the reactor pressure vessel and exposing the associated shaft 17, the nozzles 2 of the quadrant cross section covered by the shielding container 9 are successively subjected to the required working. Thereafter, the shielding container 9 is exchanged for a shielding container 6, 7 or 8, in order to work on the nozzles of another quadrant sector.

As FIG. 2 reveals, the nozzles 2 of a quadrant sector of the bottom 3 are only partially symmetrical with respect to the nozzle positions of another quadrant sector. The bottom 10a of the shielding container 9 therefore has so many shafts that all of the nozzles of a quadrant sector can be worked on with the same shielding container 9.

Depending on the situation in the reactor building, the cross section of the reactor pressure vessel may also be covered by shielding containers with a different distribution, such as two, three, five or six sectors, for example. It goes without saying that the use of a one-piece shielding container, engaging over the entire cross section of the reactor pressure vessel, is also possible. In this case, shafts may be provided for all or some of the nozzles. In the latter case, the entire container must be turned in order to be able to test and/or work on all of the nozzles.

Figure 3:
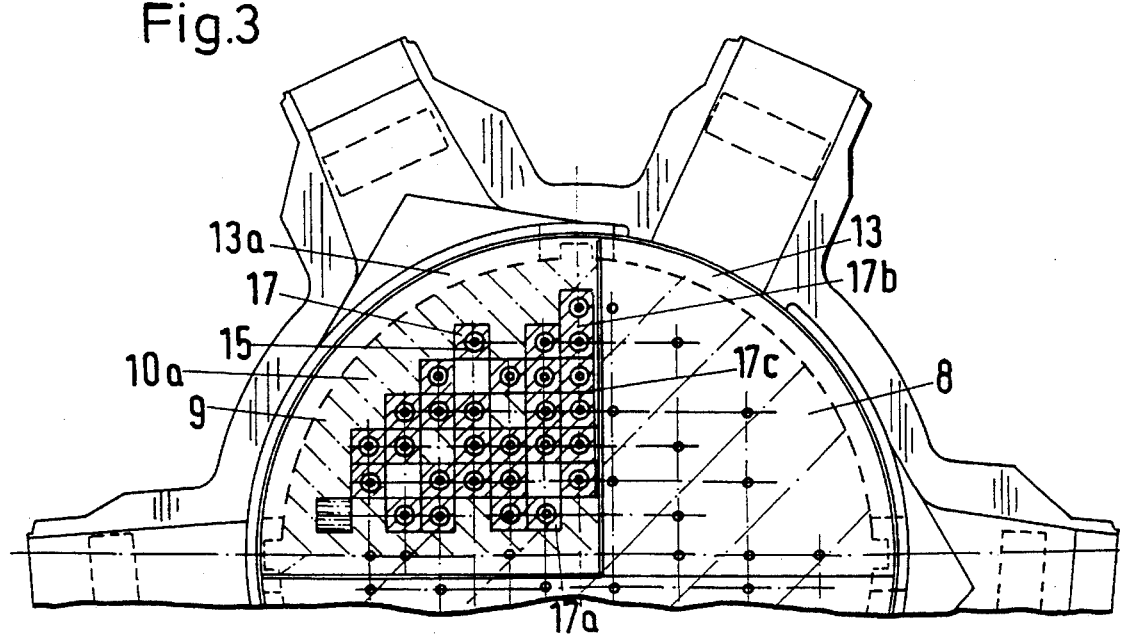
FIG. 3 is a cross-sectional view of another shaft and cartridge structure.

A structure shown in FIG. 3 provides a single shaft that engages over a plurality of nozzles. For instance, a shaft 17a engages over two nozzles 2, a shaft 17b engages over three nozzles 2 and a shaft 17c engages over four nozzles 2. If one shaft 17a, 17b, 17c is assigned more than one nozzle 2, only one nozzle is accessible for working by withdrawing the probe 4. The probes of the remaining nozzles are made to enter a shielding assigned to the shaft. The cross section of a carrier 22 is adapted correspondingly for this purpose. The shielding cartridges may also be adapted to the cross section of the respective shaft.

Figure 4:
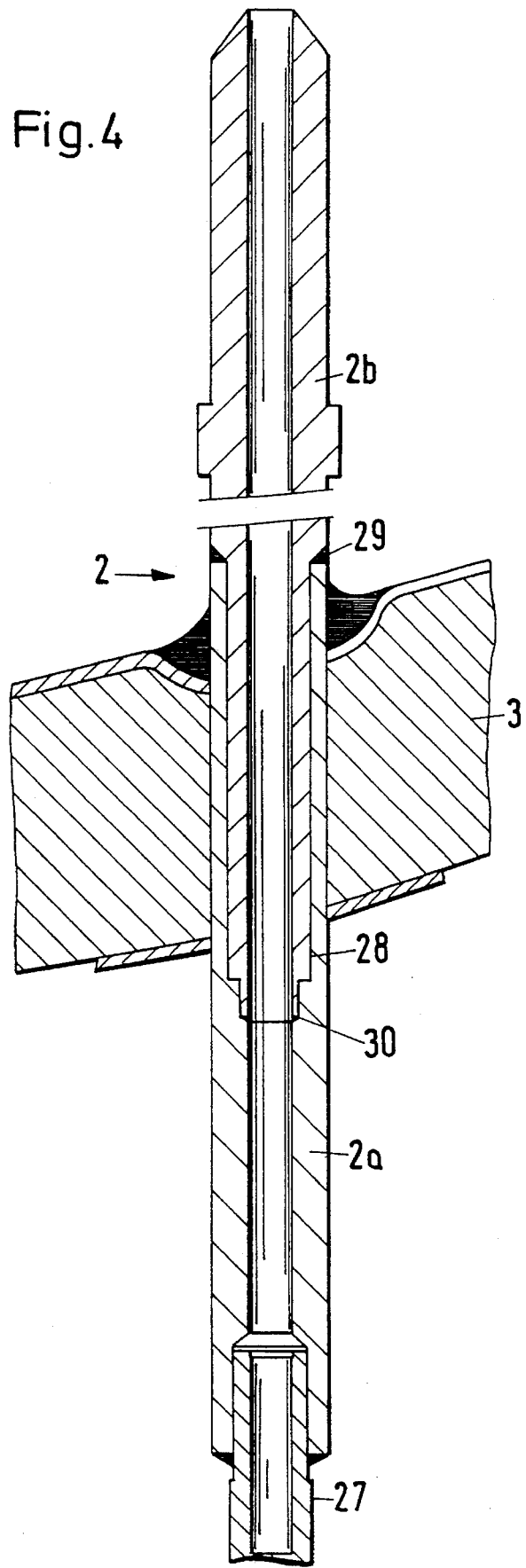
FIG. 4 is an enlarged, fragmentary, longitudinal-sectional view of a nozzle that was repaired according to the method.

The repair process for a less badly damaged nozzle 2 is represented in FIG. 4. The used nozzle is cut off just above the inner surface of the bottom 3 and a part 2a remaining in the bottom is widened to form a two-stage bore 28. A nozzle part 2b, that is configured in corresponding stages, is inserted and is connected to the nozzle part 2a remaining in the bottom 3 by means of a supporting weld seam 29. A sealing seam 30 prevents the entry of moisture between the original nozzle part and the new nozzle part. Consequently, any stress crack corrosion which may have begun in the original nozzle part is stopped.

We claim:

1. In a method for testing, repairing or exchanging nozzles penetrating a bottom of a reactor pressure vessel, wherein a reactor core and other core internals have been removed from the reactor pressure vessel, and wherein each nozzle serves for the introduction of a respective probe of an in-core instrumentation of a water-cooled nuclear reactor, the improvement which comprises:

a. inserting at least one shielding container into the reactor pressure vessel;

b. introducing all of the probes of the in-core instrumentation into a shielding region of the at least one shielding container;

c. withdrawing at least one of the probes assigned to one of the nozzles to be tested or worked on, from the reactor pressure vessel;

d. exposing a shaft extending through the shielding container and being assigned to at least one of the nozzles;

e. introducing testing devices or tools through the shaft;

f. carrying out at least one of testing and working operations;

g. withdrawing the testing devices or tools from the shaft;

h. shielding the shaft;

i. introducing the probe into the shielding region of the shielding container; and j. repeating steps c to j for further nozzles.

2. The method according to claim 1, which comprises:

cutting off a nozzle to be repaired, just above an inner surface of the bottom;

drilling open a nozzle part remaining in the bottom to form a staged nozzle bore;

inserting a new staged nozzle part into the nozzle bore;

establishing a supporting connection by means of a weld seam; and applying a sealing weld seam at a lower end of the staged bore.

3. In a water-cooled nuclear reactor having a reactor pressure vessel with a bottom, a flange and a cross section, and nozzles each penetrating the bottom for the introduction of a respective probe of an in-core instrumentation of the nuclear reactor, an apparatus for testing, repairing or exchanging the nozzles, with a reactor core and other core internals removed from the reactor pressure vessel, the apparatus comprising:

a plurality of shielding containers together filling the cross section of the reactor pressure vessel, said shielding containers having a supporting flange supported on the reactor pressure vessel flange, and said shielding containers having bottom plates ending above the nozzles;

a plurality of shafts passing through said bottom plate of at least one of said shielding container and engaging over the nozzles located in a corresponding partial cross section of the reactor pressure vessel;

a water-filled cartridge to be inserted into each of said shafts, said cartridges having bottoms each ending above a respective one of the nozzles;

tubes for receiving the probes;

at least one of said tubes being embedded in at least one of said bottoms and having a closed end protruding by a predetermined amount into said cartridge and an open end being adjacent one of the nozzles;

said bottom plate of the others of said shielding containers through which said shafts do not pass, having others of said tubes embedded therein with closed ends protruding by a predetermined amount into said shielding containers and open ends adjacent the nozzles covered by said shielding container;

carriers for traveling in said shaft and receiving at least one of testing devices and tools; and each of said shafts having means for guiding one of said carriers.

4. The apparatus according to claim 3, wherein the reactor pressure vessel has a wall with a cylindrical region, and said bottom plates and said cartridge bottoms lie on a level adjacent the cylindrical region.

5. The apparatus according to claim 3, wherein each of said means for guiding said carriers are assigned to a region of said shaft beginning below a respective one of said cartridges.

6. The apparatus according to claim 3, wherein said means for guiding said carriers are rails on which said carriers can be securely clamped.

7. The apparatus according to claim 3, including sealing elements each being disposed between the bottom of the reactor pressure vessel and a respective one of said shafts.

* * * * *